United States Patent
Ballestrazzi et al.

(10) Patent No.: US 8,082,721 B2
(45) Date of Patent: Dec. 27, 2011

(54) HIGH SPEED PACKAGING GROUP AND PACKAGING MACHINE EQUIPPED WITH SUCH GROUP

(75) Inventors: Aris Ballestrazzi, Savignano Sul Panaro (IT); Lamberto Tassi, Savignano Sul Panaro (IT)

(73) Assignee: SITMA S.p.A., Spilamberto (IT)

( * ) Notice: Subject to any disclaimer, the term of this patent is extended or adjusted under 35 U.S.C. 154(b) by 285 days.

(21) Appl. No.: 12/392,509

(22) Filed: Feb. 25, 2009

(65) Prior Publication Data
US 2009/0223178 A1    Sep. 10, 2009

(30) Foreign Application Priority Data
Mar. 10, 2008 (IT) .............................. MI2008A0392

(51) Int. Cl.
B65B 9/02 (2006.01)
B65B 51/16 (2006.01)
B65B 51/26 (2006.01)
B65B 41/16 (2006.01)
(52) U.S. Cl. .............. 53/168; 53/550; 53/553; 53/374.6
(58) Field of Classification Search .................... 53/168, 53/550, 553, 374.3–374.6, 371.3–371.6, 53/375.4, 376.2
See application file for complete search history.

(56) References Cited

U.S. PATENT DOCUMENTS

| | | | | |
|---|---|---|---|---|
| 1,810,864 A * | 6/1931 | Vogt | | 53/550 |
| 3,498,019 A * | 3/1970 | Rait | | 53/450 |
| 3,517,479 A * | 6/1970 | Pinkham | | 53/550 |
| 3,727,365 A * | 4/1973 | Stohlquist | | 53/553 |
| 4,048,003 A * | 9/1977 | Bolli | | 156/582 |
| 4,341,057 A * | 7/1982 | Limousin | | 53/553 |
| 4,563,860 A * | 1/1986 | Pfankuch | | 53/374.6 |
| 4,758,293 A * | 7/1988 | Samida | | 156/73.1 |
| 4,862,673 A * | 9/1989 | Francioni | | 53/374.4 |
| 4,876,842 A * | 10/1989 | Ausnit | | 53/550 |
| 5,094,657 A * | 3/1992 | Dworak et al. | | 53/374.4 |
| 5,448,934 A * | 9/1995 | Boldrini et al. | | 53/168 |
| 5,671,593 A * | 9/1997 | Ginestra et al. | | 53/168 |
| 5,694,745 A * | 12/1997 | Spatafora et al. | | 53/550 |
| 6,481,188 B1 * | 11/2002 | Graham et al. | | 53/374.5 |
| 2006/0042759 A1 | 3/2006 | Honegger | | |
| 2007/0209323 A1 | 9/2007 | Honegger | | |

FOREIGN PATENT DOCUMENTS

EP    1 502 854 A1    2/2005
GB    2151179 A *    7/1985

* cited by examiner

*Primary Examiner* — Stephen F Gerrity
(74) *Attorney, Agent, or Firm* — Oblon, Spivak, McClelland, Maier & Neustadt, L.L.P.

(57) ABSTRACT

A packaging group that packages products at a high speed when the products are fed in succession in accordance with a predefined and variable pitch is provided. The packaging group includes a conveyor of the products, at least one roll of at least one plastic film, a feed mechanism that feeds the at least one plastic film from the at least one roll respectively atop and underneath the products substantially upon exiting the conveyor, a counter-welder belt downstream of the conveyor which receives the products covered on their upper and lower parts with the at least one plastic film, and a transverse welder device at the counter-welder belt. The transverse welder device includes a rotating star-like structure equipped with at least three spokes provided at their tips with welder mechanisms cooperating one after the other in succession with the counter-welder belt, in order to weld together portions of the at least one plastic film between the products advancing on the counter-welder belt.

16 Claims, 5 Drawing Sheets

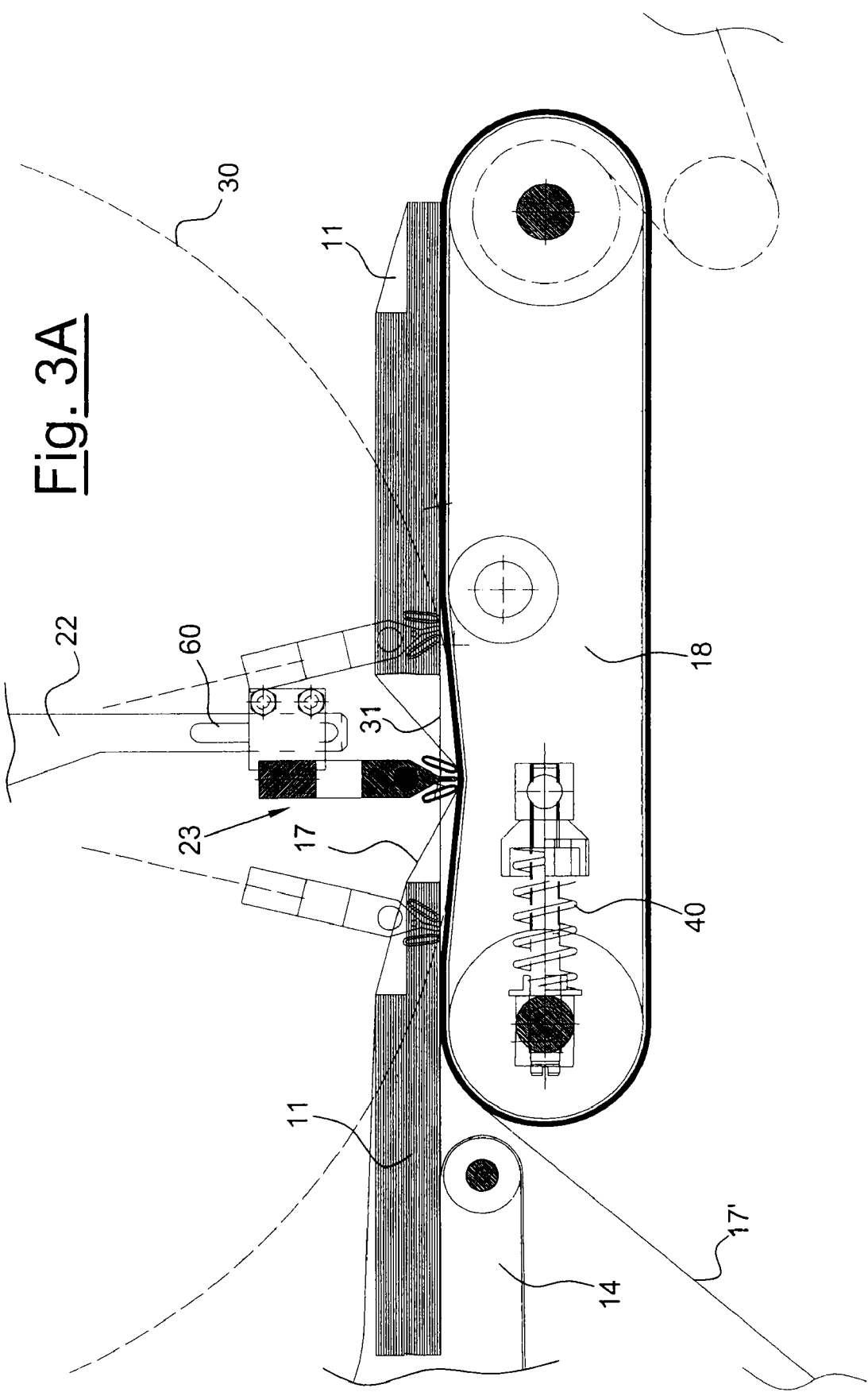

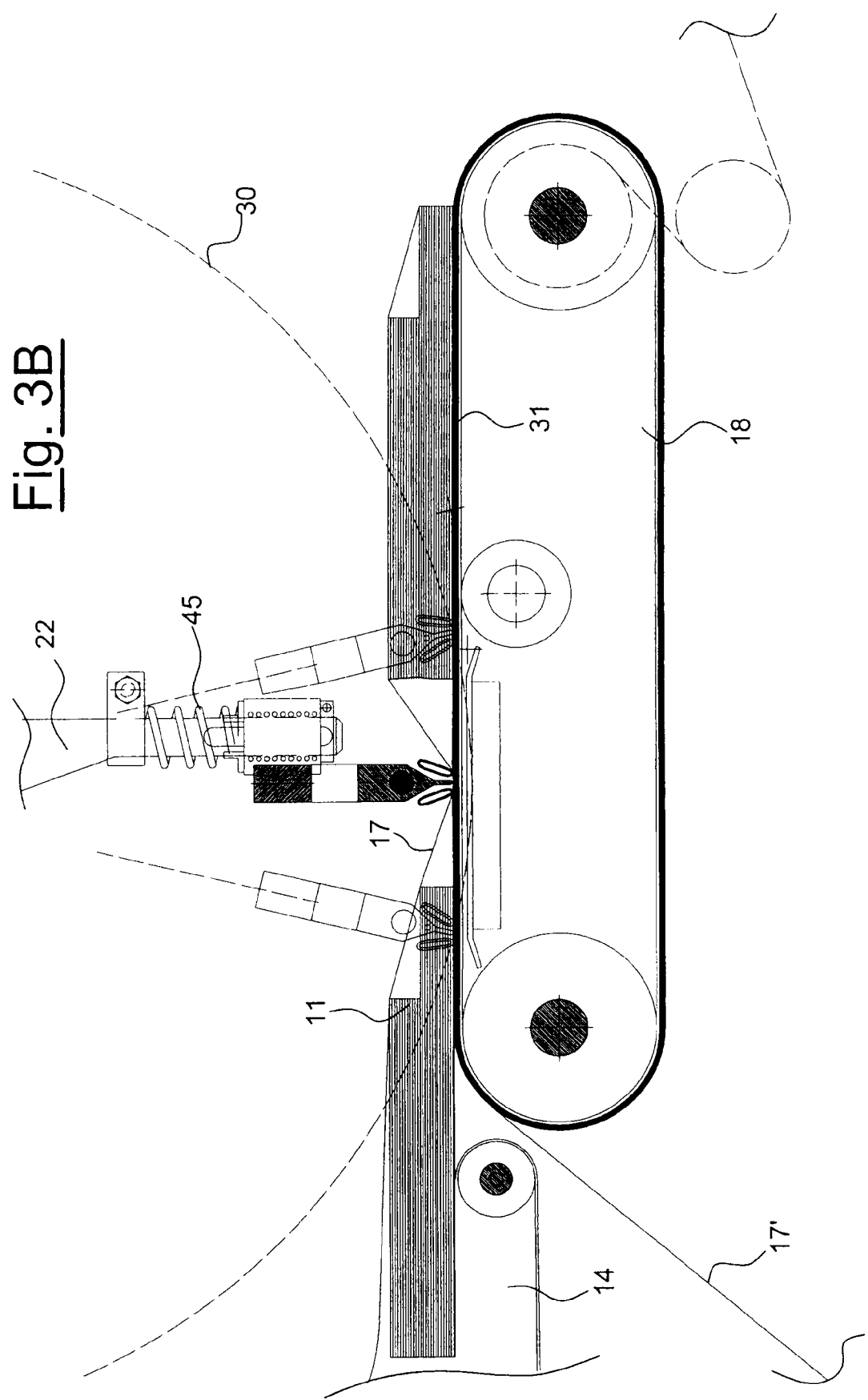

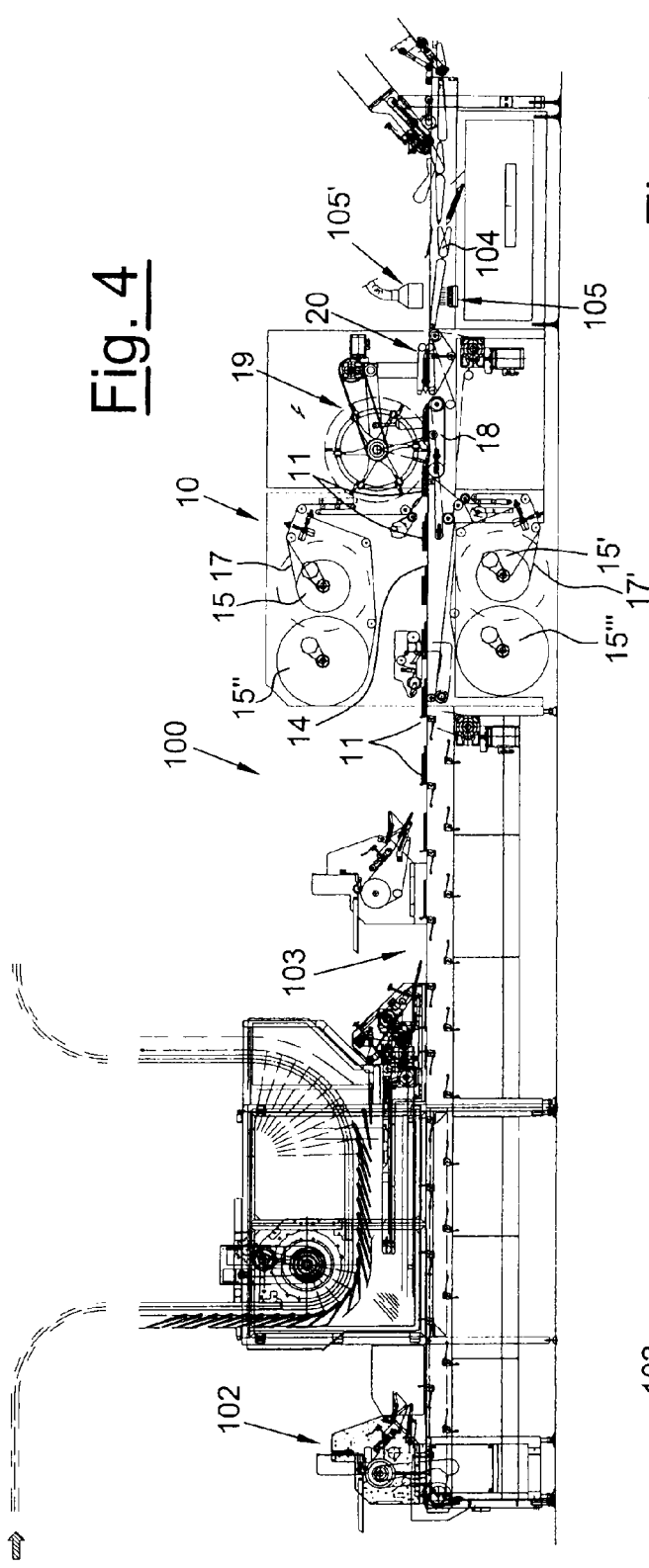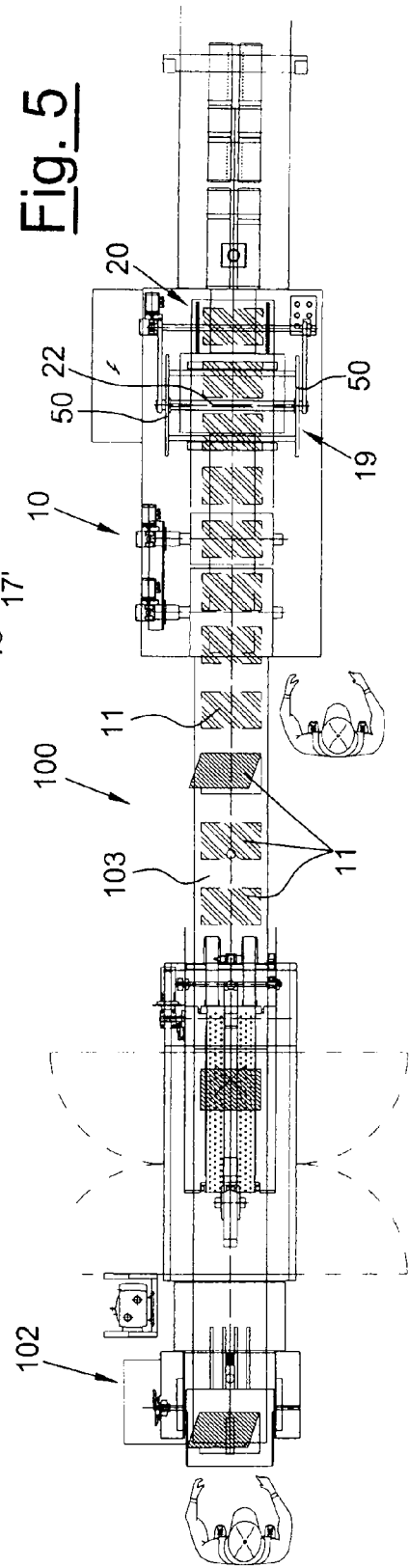

HIGH SPEED PACKAGING GROUP AND PACKAGING MACHINE EQUIPPED WITH SUCH GROUP

The present invention refers to a high speed packaging group and to a packaging machine equipped with such group.

Many different types of packaging groups exist today which have the common aim of achieving a finished product, generally of publishing type, which is contained in a closed manner or at least partially wrapped by a protective plastic layer, so as to maintain all the possible items composing the product itself securely joined together.

As mentioned above, a very well-known embodiment are the publishing products comprising a daily newspaper but also another magazine, to which several inserts are attached.

Currently, the existing packaging groups of the aforesaid publishing products differ from each other by the nature of the welding devices which they comprise, which in a different manner weld the protective film around the product during the advancement of the products themselves.

A first embodiment of welding devices used today are the particular welding devices which cyclically complete an elliptical trajectory, with which they follow the advancing product; such devices reach the product, weld the plastic film and subsequently leave the product, returning to the start position so to follow a new advancing product.

It appears clear, as a disadvantageous aspect of such machines, that such welding devices have a low yield over one welding cycle.

Indeed, the welding device of the above-described type only "welds" for a brief period of a cycle while for the rest of the time it only completes movements, either following the advancing product or returning to the initial position.

In order to remedy such problem, welding devices of "vertical" type currently exist, in which the welder does not carry out horizontal movements but only rectilinear movements, from the top towards the bottom. Disadvantageously, however, such machines do not allow maintaining a high production speed, forcing the products to slow down, if not actually stop, at such welding devices of "vertical" type.

Another solution known today are the particular welding devices, called "tank-type", in which the products can continuously advance and there are no particular long time periods in which the welders remain inactive. Nevertheless, disadvantageously, even such "tank-type" welder devices are strongly limited, in that they cannot package different size products without employing long modification and substitution operations of the packaging group itself.

The object of the present invention is that of making a device capable of solving the abovementioned drawbacks of the prior art in an extremely simple, economical and particularly functional manner.

Another object is that of making a high speed packaging group and a packaging machine equipped with such group wherein it is possible to make the products advance rather quickly and continuously and in which the welding means are in operation for nearly the entire welding cycle.

Still another object is that of making a high speed packaging group and a packaging machine equipped with such group wherein it is possible to package products of any size without employing long modification and substitution operations of the packaging group itself. Still another object is that of making a high speed packaging group and a packaging machine equipped with such group wherein the operation of the welding means occurs over a considerable time period, providing a secure welding.

These objects according to the present invention are achieved by making a high speed packaging group and a packaging machine equipped with such group as set forth respectively in the present application.

The characteristics and advantages of a high speed packaging group according to the present invention and a packaging machine equipped with such group will be more evident from the following exemplifying and non-limiting description, referred to the attached schematic drawings, in which:

FIG. 3A shows an enlarged elevation view of a detail of the packaging group of FIG. 2;

FIG. 3B shows an enlarged elevation view of another embodiment of the detail of FIG. 3;

FIG. 4 shows an elevation view of a packaging machine equipped with a high speed packaging group according to the present invention;

FIG. 5 shows a top view of the packaging machine of FIG. 4.

With reference to the figures, a high speed packaging group according to the present invention is indicated with 10 and a packaging machine equipped with such group with 100.

The high speed packaging group 10, subject of the present invention, is adapted for packaging products 11 fed in succession in accordance with a predefined and variable pitch, according to the requirements and the size of the products 11 themselves.

In particular, with the term packaging, it is intended the achieving of a finished product contained in a closed manner or at least partially wrapped by a protective plastic layer, so as to maintain all the possible items composing the product itself securely joined together.

A very well-known embodiment are the publishing products, such as daily newspapers but also other magazine, to which several inserts are often attached. In particular, then, the packaging of the aforesaid publishing products together with the related inserts by means of a common plastic film allows transporting the product, in the reported example therefore "daily newspaper+insert", without risking to lose the insert itself.

Figure 1:
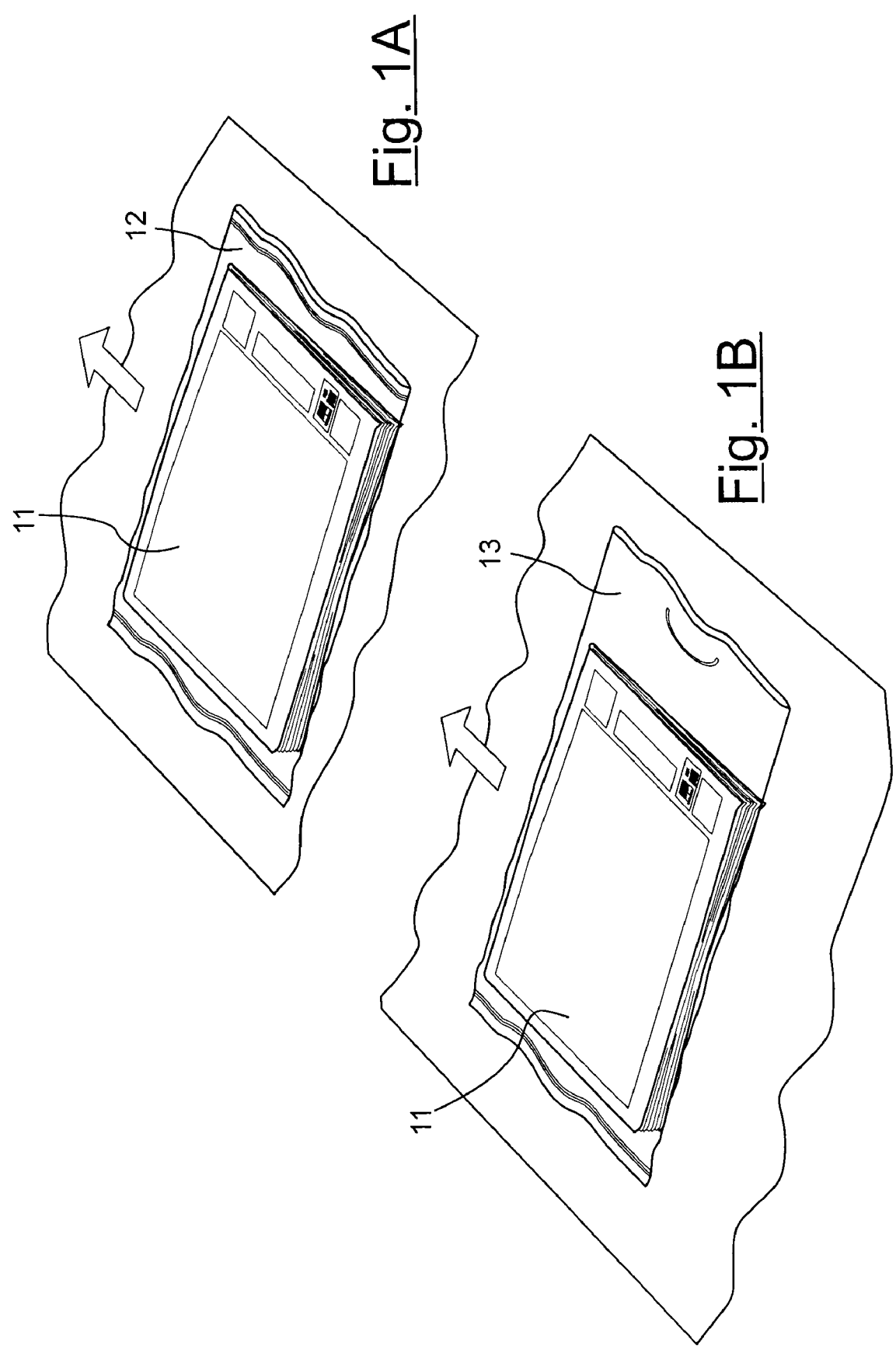
FIGS. 1A and 1B show two possible types of product packaging achievable by means of the high speed packaging group according to the present invention.

In FIGS. 1A and 1B, two examples of two possible packaging types are reported that can be achieved by means of the high speed packaging group according to the present invention; FIG. 1A shows a publishing product enclosed in a wrapper so to make a "closed envelope" 12, while in FIG. 1B the same publishing product is shown enclosed in a wrapper that is open along one side to achieve a "bag" or "sack" 13, possibly also provided with a handle.

Figure 2:
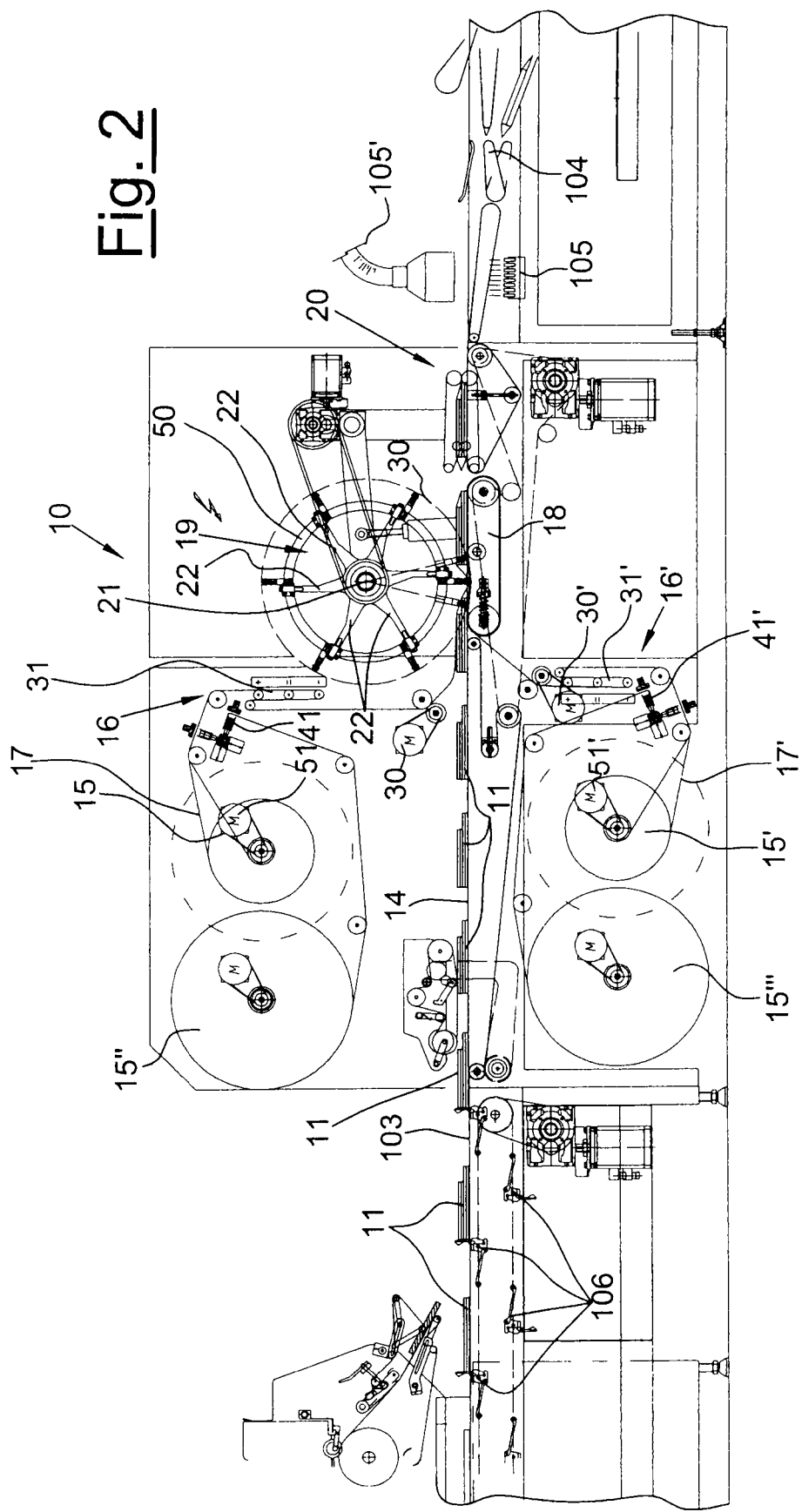
FIG. 2 shows an elevation view of a high speed packaging group according to the present invention.

The high speed packaging group 10 according to the present invention allows quickly achieving the aforesaid packages and comprises, as is visible in FIG. 2, a conveyor 14, fed by products 11 in succession in accordance with a predefined pitch which allows to advance such products 11, at least one roll 15, 15' of plastic film 17, 17', preferably two rolls 15, 15' of two plastic films 17, 17' that are motorised 51, 51' and placed respectively one atop and the other underneath the conveyor 14, and feed means 16, 16' of the at least a plastic film 17, 17' from the relevant roll 15, 15' respectively atop and underneath the products 11.

In the following description, reference will be exclusively made to two plastic films 17, 17', in accordance with the shown figures, affirming that, if there is only one roll 15, 15', such two plastic films 17, 17' are part of a single plastic film 17 which respectively wraps around the upper and lower surface of the advancing products 11 due to particular feed means 16, 16'.

In particular, according to that shown in the figures, where two rolls 15, 15' are present, such coupling between the two plastic films 17, 17' and the upper and lower surfaces of the advancing products 11 in the group 10 preferably occurs at the outlet of the conveyor 14 where the lower surface of the products is more easily accessible.

The high speed packaging group 10 according to the present invention, downstream of the conveyor 14, comprises a counter-welder belt 18 which, as described above, receives the products 11, the lower film 17' between the counter-welder belt 18 itself and the products 11, and the upper film 17 atop the same products 11.

At the counter-welded belt 18, the presence is provided for of a transverse welder device 19 which comprises a rotating star-like structure 21 equipped with at least three spokes 22, each of which provided with welder means 23 in a tip portion.

Such rotating star-like structure 21, for safety reasons, can be laterally delimited by two solid discs 50 projecting on the side of the counter-welder belt 18.

In particular, according to the invention, such welder means 23, as visible in the FIGS. 3A and 3B, cooperate one after the other in quick succession with the counter-welder belt 18 in order to weld together the two plastic film portions 17, 17' present between the products 11 advancing on the counter-welder belt 18 itself.

In fact, as is visible in the aforesaid FIGS. 3A and 3B, the rotating star-like structure 21 is synchronised with the counter-welder belt 18 such that the welder means 23 interact with the counter-welder belt 18 itself, always at the portions of the two plastic films 17,17' comprised between the two advancing products 11. According to a preferable embodiment, the packaging group 10 can also comprise a longitudinal welder device 20 which welds the lateral portions of the two plastic films 17, 17' projecting from at least one side of the products 11.

In particular, if the longitudinal welder device 20 welds on both sides the two plastic films 17, 17' projecting laterally from the products 11, the group 10 achieves packages of "closed envelope" type, shown in FIG. 1A, while on the other hand if the longitudinal welder device 20 welds on only one side the two plastic films 17, 17' projecting laterally from the products 11, the group 10 achieves packages of "bag or sack" type, shown in FIG. 1B.

As visible in FIG. 2, the aforesaid spokes 22 which compose the star-like structure are preferably regularly spaced from each other according to a same angle.

For example, as in the shown case, if there are six spokes 22, the latter are arranged at intervals of 60° from each other.

According to the invention, therefore, it will be possible to make the products 11 advance quite quickly by supplying at least one welder means 23 in nearly continuous operation in the cycle of the transverse welding device 19.

Moreover, according to the invention, the aforesaid welding means 23 provided in the tip portions of the spokes 22 are advantageously fixable with respect to the related spoke 22—not in a single position but in a variable position selected between a range of positions raising at least partially up the associated spoke 22.

Such particular feature is in particular visible in FIG. 3A, in which the aforesaid welder means 23 can assume any one position comprised between the movement allowed the welder means 23 themselves by a slot 60 made on the tip portions of the spokes 22.

In particular, then, with reference to the pitch and to the size of the products 11, it will be possible to constrain the welder means 23 on the related spokes 22 in a position such to make an ideal synchronism with the counter-welder belt 18, in order to make the welder means 23 themselves always operate on the portions of the two plastic films 17, 17' comprised between two advancing at the same speed as the products 11.

As shown in FIGS. 3A and 3B, since the welder means 23 are mounted on a rotating star-like structure 21, they realize a circular trajectory 30.

In particular, according to the invention, such welder means 23 are placed in a position such that during their rotation the aforesaid circular trajectory 30 has at least one section co-penetrating the plane 31 defined by the counter-welder belt 18.

In such a manner, according to the present invention the welding operation of the two plastic films 17, 17', which occurs by pressing and welding such two plastic films 17, 17' against the counter-welder belt 18, does not occur instantaneously but along such interference zone of the related trajectories 30, 31 of the welder means 23 and the counter-welder belt 18, in which the two plastic films 17, 17' are present between the latter.

Hence, the operation of the welder means 23 is maintained for the entire aforesaid co-penetrating section of the trajectories 30 and 31.

Two different embodiments are provided for in agreement with that described above according to the invention. The first, shown in FIG. 3A, provides that the counter-welder belt 18 is at least partially made of temperature-resistant material that can be deformed under the action of the welder means 23, which locally deform the counter-welder belt 18 in accordance with the trajectory 30.

In such case, the counter-welder belt 18 can advantageously be of the type sprung with, for example, at least one spring 40.

The second embodiment, shown in FIG. 3B, provides that the welder means 23 are instead sprung, for example by means of at least one spring 45, while the counter-welder belt 18 is made of a temperature-resistant material, with rigid and flat trajectory 31 at least in the contact zone with the welder means 23. In such case, in the co-penetrating zone of the trajectories 30 and 31, it will be the welding means 23 to change trajectory by sliding horizontally on the counter-welder belt 18.

In order to avoid errors during the above-described welding step, in both cases wherein the welder means 23 and the counter-welder belt 18 advance coupled together for a considerably longer section than a single contact point, according to the invention the rotating star-like structure 21 and the counter-welder belt 18 are synchronised such that the peripheral speed of the welding means 23 is equal, at least during the aforesaid contact step, to the advancing speed of the counter-welder belt 18.

Otherwise, since the two plastic films 17, 17' are interposed between the welder means 23 and the counter-welder belt 18, slips could be verified which would not make the welding of the two plastic films 17, 17' of rectilinear transverse type, as desired.

Moreover, in order to avoid interruptions, the packaging group 10 can also comprise an automatic substitution group 41, 41' of the two rolls 15, 15' when finished with two new rolls 15'', 15''', as well as automatic actuation 30, 30' and control 38, 38' means of the unwinding of the two plastic films 17, 17' from the two rolls 15, 15'.

According to a preferred embodiment, such actuation means 30, 30' of the unwinding of the two plastic films 17, 17' from the two rolls 15, 15' comprise two motorised rollers 30, 30' acting respectively on the two plastic films 17, 17' while the control means 38, 38' of the unwinding of the two plastic films 17, 17' from the two rolls 15, 15' comprise two rollers 38, 38' on which the two plastic films slide 17, 17' slide and which are movable between an upper position, indicated with "+" and a lower position, indicated with "−".

Associated with such movable two rollers 38, 38', sensors are provided for which are capable of detecting their position and controlling an unwinding speed increase of the two plastic films 17, 17' from the two rolls 15, 15', if the two rollers 38, 38' are situated in proximity to the upper position "+".

Alternatively, if the two rollers 38, 38' are situated in proximity to the lower position "−", the aforesaid sensors will slow down the two rolls 15, 15' in order to supply, in any case, a correct feed of the two plastic films 17, 17'.

According to the invention, the packaging group 10 of products fed with pitch as previously described can make up part of a packaging machine 100.

Such packaging machine 100, upstream of the packaging group 10, comprises a feeder 102 of the products 11 to be packaged, a conveyor 103 of the fed products 11, preferably equipped with means 106 for the pitch placement of the fed products 11 themselves, such as a plurality of flanked pusher elements 106, while downstream of the packaging group 10 the packaging machine 100 comprises control means of the packaged products 11 and discard means 104, 105, 105' respectively capable of discarding possible products 11 that were controlled and found to be defective by means of a trapdoor 104.

Possible "empty" packages, i.e. formed only by the plastic film 17, 17', are expelled through an ejector 105 that collaborates with an aspirator 105'.

Preferably, the packaging machine 100 according to the invention can comprise aspirator means of the portions of the two plastic films 17, 17' separated during the welding of the related packaged products 11.

Finally, in order to allow a correct functioning of the packaging machine 100, the packaging group 10 is synchronised with the conveyor 103.

It is then very easy to understand the functioning of the device that is the subject of the invention.

The packaging group 10 with high packaging speed of products 11 fed in succession in accordance with a predefined and variable pitch according to the invention comprises a conveyor 14 of the products 11, two rolls 15, 15' of two plastic films 17, 17', feed means 16, 16' of two plastic films 17, 17' from the two rolls 15, 15' respectively atop and underneath the products 11 exiting from the conveyor 14, a counter-welder belt 18 downstream of the conveyor 14 which receives the products 11 covered on their upper and lower parts by the two plastic films 17, 17' and a transverse welder device 19 at the counter-welder belt 18.

In particular, such transverse welder device 19 comprises a rotating star-like structure 21 equipped with at least three spokes 22 provided on their tips with welder means 23 cooperating one after the other in quick succession with said counter-welder belt 18, in order to weld together portions of the two plastic films 17, 17' present between the products 11 advancing on the counter-welder belt 18.

Advantageously, therefore, according to the present invention it is possible to make the products 11 quickly advance by supplying at least one welder means 23 in nearly continuous operation in the cycle of the transverse welding device 19, contrary to the prior art where the known transverse welder devices are only in operation for a small part of a relative cycle.

Moreover, advantageously, according to the invention the welding means 23 on the relative spokes 22 are selectively fixable in a variable position, such to make an ideal synchronism with the counter-welder belt 18 so to always operate on the portions of the two plastic films 17, 17' comprised between two advancing products 11, independent of the pitch and size of the products 11 to be packaged.

Finally, in the group 10 according to the invention, the collaboration between the welder means 23 and the counter-welder belt 18 does not occur instantaneously but rather over a considerably time period, in such a manner rendering the welding itself particularly effective and secure.

It has thus been seen that a high speed packaging group and a packaging machine equipped with such group according to the present invention achieves the objects highlighted above.

The high speed packaging group and the packaging machine equipped with such group of the present invention thus conceived is susceptible to numerous modifications and variants, all part of the same inventive concept; moreover, all the details can be substituted with technically equivalent elements. In practice, the materials used, as well as their size, can be of any type according to the technical requirements.

The invention claimed is:

1. A packaging group with high packaging speed of products fed in succession in accordance with a predefined and variable pitch, comprising:
    a conveyor of said products;
    at least one roll of at least one plastic film;
    a feed mechanism that feeds said at least one plastic film from said at least one roll respectively atop and underneath said products exiting from said conveyor;
    a counter-welder belt downstream of said conveyor, and moving in the same direction as said conveyor, which receives said products covered on their upper and lower parts with said at least one plastic film;
    a transverse welder device at said counter-welder belt, said transverse welder device comprising a rotating star-like structure equipped with at least three spokes provided at their tips with a welder mechanism cooperating one after the other in succession with said counter-welder belt, in order to weld together portions of said at least one plastic film between said products advancing on said counter-welder belt, said welder mechanism being positioned such that, during rotation of said rotating star-like structure, the welder mechanism makes a circular trajectory at least partially co-penetrating a plane defined by said counter-welder belt; and
    a spring connected to a counter-welder belt roller of the counter-welder belt that allows the counter-welder belt to deform in accordance with the circular trajectory of the welder mechanism under the action of the welder mechanism.

2. A packaging group according to claim 1, wherein the packaging group further comprises:
    two rolls of two plastic films,
    wherein said feed mechanism feeds said two plastic films from said two rolls respectively atop and underneath said products exiting from said conveyor.

3. A packaging group according to claim 1, wherein the packaging group further comprises:
    a longitudinal welder device of portions of said two plastic films projecting at least from one side of said products.

4. A packaging group according to claim 1, wherein said spokes are regularly spaced from each other in accordance with one same angle.

5. A packaging group according to claim 1, wherein said welder means are fixable with respect to said rotating star-like structure in a range of positions along said tip portion of said spokes.

6. A packaging group according to claim 1, wherein said counter-welder belt is at least partially made of temperature-resistant material and is deformable under the action of said welder mechanism.

7. A packaging group according to claim 1, wherein said rotating star-like structure and said counter-welder belt are synchronised such that the peripheral speed of said welder mechanism is equal to the advancing speed of said counter-welder belt.

8. A packaging group according to claim 1, wherein the packaging group comprises an automatic substitution group of said at least one roll when finished with at least one new roll, without stopping said packaging group.

9. A packaging group according to claim 1, wherein the packaging group comprises an actuation mechanism and a control mechanism to control the unwinding of said at least one plastic film from said at least one roll.

10. A packaging group according to claim 9, wherein said actuation mechanism to control the unwinding of said at least one plastic film from said at least one roll includes at least one motorised roller operating on two plastic films, respectively, and that said control mechanism to control the unwinding of said at least one plastic film from said at least one roll includes sensors adapted to unwind movable rollers on which said two plastic films slide, associated with sensors capable of detecting their position.

11. A packaging machine comprising a feeder of products to be packaged, a fed products conveyor of said fed products equipped with means for the pitch placement of said fed products, a packaging group of said pitch-fed products according to claim 1.

12. A packaging machine according to claim 11, wherein the packaging group comprises, downstream of said packaging group, means for controlling said packaged products and means for discarding some of said controlled products.

13. A packaging machine according to claim 11, wherein said means for the pitch placement comprise a plurality of flanked pusher elements.

14. A packaging machine according to claim 11, wherein the packaging group comprises suction means of portions of two plastic films separated by said fed products.

15. A packaging machine according to claim 11, wherein said packaging group is synchronised with said fed products conveyor.

16. A packaging group with high packaging speed of products fed in succession in accordance with a predefined and variable pitch, comprising:
   a conveyor of said products;
   at least one roll of at least one plastic film;
   a feed mechanism that feeds said at least one plastic film from said at least one roll respectively atop and underneath said products exiting from said conveyor;
   a counter-welder belt downstream of said conveyor, and moving in the same direction as said conveyor, which receives said products covered on their upper and lower parts with said at least one plastic film;
   a transverse welder device at said counter-welder belt, said transverse welder device comprising a rotating star-like structure equipped with at least three spokes provided at their tips with a welder mechanism cooperating one after the other in succession with said counter-welder belt, in order to weld together portions of said at least one plastic film between said products advancing on said counter-welder belt; and
   a spring connected to the welder mechanism and a spoke of the at least three spokes of the rotating star-like structure that allows the welder mechanism to move linearly along the spoke of the rotating star-like structure,
   wherein the counter-welder belt is rigid such that it does not deform under the action of the welder mechanism.

* * * * *